United States Patent
Sonobe (10) Patent No.: US 10,148,342 B2
(45) Date of Patent: Dec. 4, 2018

(54) RELAYING DEVICE, COMMUNICATION SYSTEM, AND METHOD FOR RELAYING AUDIO SIGNAL

(71) Applicant: ICOM INCORPORATED, Osaka-shi, Osaka (JP)

(72) Inventor: Hirotaka Sonobe, Osaka (JP)

(73) Assignee: Icom Incorporated, Osaka-shi, Osaka (JP)

( * ) Notice: Subject to any disclaimer, the term of this patent is extended or adjusted under 35 U.S.C. 154(b) by 0 days.

(21) Appl. No.: 15/321,678

(22) PCT Filed: Jul. 2, 2015

(86) PCT No.: PCT/JP2015/069086
§ 371 (c)(1),
(2) Date: Dec. 22, 2016

(87) PCT Pub. No.: WO2016/002866
PCT Pub. Date: Jan. 7, 2016

(65) Prior Publication Data
US 2017/0163332 A1    Jun. 8, 2017

(30) Foreign Application Priority Data

Jul. 4, 2014 (JP) ................................ 2014-138465

(51) Int. Cl.
*H04B 7/155* (2006.01)
*G06F 3/16* (2006.01)
(Continued)

(52) U.S. Cl.
CPC .......... *H04B 7/15557* (2013.01); *G06F 3/16* (2013.01); *H04L 5/14* (2013.01); *H04L 5/16* (2013.01);
(Continued)

(58) Field of Classification Search
CPC .......... H04B 7/15557; H04L 5/14; H04L 5/16; G06F 3/16; H04M 3/568; H04M 2207/18
See application file for complete search history.

(56) References Cited

U.S. PATENT DOCUMENTS 6,832,093 B1 * 12/2004 Ranta ................... H04W 48/04
455/422.1
2001/0055279 A1 * 12/2001 Abe .................. H04L 29/06027
370/260
(Continued)

FOREIGN PATENT DOCUMENTS

| JP | 2001-326740 A | 11/2001 |
|----|---------------|---------|
| JP | 2011-135291 A | 7/2011  |
| JP | 2014-087027 A | 5/2014  |

OTHER PUBLICATIONS

International Search Report of PCT/JP2015/069086.

*Primary Examiner* — Ajay Cattungal
(74) *Attorney, Agent, or Firm* — Muncy, Geissler, Olds & Lowe, P.C.

(57) ABSTRACT

[Problem] To enable the response audio signal of one transceiver to be heard by other transceivers, in cases when a plurality of subordinate transceivers (wireless handset) are present.
[Solution] A relaying device is provided with: a wireless apparatus interface having a repeater connected thereto; a signal processing unit connected to the wireless apparatus interface; a network interface connected to a network; a packet processing unit connected to the network interface; and a mixing unit provided between the signal processing unit and the packet processing unit. The packet processing unit reads out an audio signal from a packet inputted from the network interface, and outputs the audio signal as a downlink audio signal. The mixing unit inputs the downlink audio signal into the signal processing unit, and inputs an (Continued)

uplink audio signal into the signal processing unit. The signal processing unit outputs, to the wireless apparatus interface, the downlink audio signal and the uplink audio signal.

9 Claims, 10 Drawing Sheets

(51) Int. Cl.
    *H04L 5/14*     (2006.01)
    *H04L 5/16*     (2006.01)
    *H04M 3/56*     (2006.01)

(52) U.S. Cl.
    CPC ........ H04M 3/568 (2013.01); *H04M 2207/18* (2013.01)

(56) References Cited

U.S. PATENT DOCUMENTS

| | | | |
|---|---|---|---|
| 2003/0086366 A1* | 5/2003 | Branlund | H04B 1/71052 370/208 |
| 2010/0227631 A1* | 9/2010 | Bolton | H04L 51/24 455/466 |
| 2014/0119274 A1* | 5/2014 | Uwamori | H04B 7/15507 370/315 |

* cited by examiner

RELAYING DEVICE, COMMUNICATION SYSTEM, AND METHOD FOR RELAYING AUDIO SIGNAL

TECHNICAL FIELD

The present invention relates to a relaying device that relays communication between a wireless communication apparatus and an apparatus on a network.

BACKGROUND ART

A relaying device and a communication system have been advanced that relay a wireless communication apparatus such as a transceiver to a network so as to enable communication between a transceiver and an SIP apparatus or between transceivers in communication areas where radio waves do not reach each other of the transceivers (see Japanese Unexamined Patent Application Publication No. 2011-135291, for example).

CITATION LIST

Patent Literature

PTL 1: Japanese Unexamined Patent Application Publication No. 2011-135291

SUMMARY OF INVENTION

Technical Problem

In the system of PTL 1, transmission and reception are performed on different frequencies in communication between a transceiver and a repeater of a wireless relaying apparatus. Therefore, in a case where there are multiple transceivers under the control of the repeater (a relaying device), they cannot directly communicate with each other, and even when one of the transceivers responds to a call from the network, sounds of the response cannot be heard through the other transceivers.

An object of the present invention is to provide a relaying device, a communication system, and a method for relaying an audio signal that are configured such that in a case where there are multiple transceivers (wireless handsets) under the control of the relaying device, sounds of a response of one of the transceivers can be heard through the other transceivers.

Solution to Problem

A relaying device of the present invention includes: a wireless apparatus interface connected to a wireless relaying apparatus (repeater) communicating with a wireless handset; a signal processing unit connected to the wireless apparatus interface; a network interface connected to a network which acts as a data communication network; a packet processing unit connected to the network interface; and a mixing unit provided between the signal processing unit and the packet processing unit. The wireless apparatus interface is inputted a received signal from the wireless relaying apparatus and outputs a transmitting signal to be transmitted to the wireless handset to the wireless relaying apparatus. The network interface transmits or receives packets to or from another network device. The signal processing unit outputs a received signal inputted from the wireless apparatus interface to the packet processing unit as an uplink audio signal. The packet processing unit packetizes the uplink audio signal and outputs the packetized audio signal to the network interface. Further, the packet processing unit reads out an audio signal from packets inputted from the network interface and outputs the audio signal as a downlink audio signal. The mixing unit inputs the downlink audio signal to the signal processing unit and inputs the uplink audio signal to the signal processing unit. The signal processing unit outputs the downlink audio signal and the uplink audio signal inputted from the mixing unit to the wireless apparatus interface as a transmitting signal. In a case where a downlink audio signal and an uplink audio signal are inputted at the same time, the mixing unit mixes them and output them to the signal processing unit. In a case where either a downlink audio signal or an uplink audio signal is inputted, the mixing unit inputs the inputted signal to the signal processing unit.

In the present invention, the relaying device may further include multiple communication paths including the wireless apparatus interface, the signal processing unit, and the packet processing unit. The mixing unit inputs an uplink audio signal or a downlink audio signal of another communication path to the packet processing unit together with the uplink audio signal. The mixing unit inputs an uplink audio signal or a downlink audio signal of the another communication path to the signal processing unit together with the downlink audio signal.

Multiple wireless apparatus interfaces of the multiple paths may include both an analog wireless apparatus interface and a digital wireless apparatus interface. Further, a half-duplex wireless relaying apparatuses or full-duplex wireless relaying apparatuses may be mixedly connected to multiple wireless apparatus interfaces of the multiple paths, respectively.

A communication system of the present invention includes: the relaying apparatus described above; a wireless relaying apparatus connected to the wireless apparatus interface; and multiple wireless handsets. Each of the wireless handsets is a half-duplex wireless communication apparatus that transmits an audio signal on a first frequency and receives an audio signal on a second frequency. The wireless relaying apparatus outputs the audio signal to the wireless apparatus interface upon receiving an audio signal on the first frequency. The wireless relaying apparatus transmits the audio signal on the second frequency when the downlink audio signal is inputted from the wireless apparatus interface.

A method of the present invention for relaying an audio signal relays an audio signal between a wireless apparatus interface and a network interface. To the wireless apparatus interface, a wireless relaying apparatus communication with a wireless handset is connected. The wireless apparatus interface is inputted a received signal from the wireless relaying apparatus. The wireless apparatus interface also outputs a transmitting signal to be transmitted to the wireless handset to the wireless relaying apparatus. The network interface is connected to a network acting as a data communication network, and transmits or receives packets to or from another network device connected to the network. A received signal inputted from the wireless apparatus interface is packetized and outputted from the network interface, and the received signal is inputted again to the wireless apparatus interface as an uplink audio signal. An audio signal read out from audio packets inputted from the network interface is inputted to the wireless apparatus interface as a downlink audio signal. Then, the wireless apparatus interface outputs the downlink audio signal and the uplink audio signal thus inputted to the wireless apparatus interface as a transmitting signal.

Advantageous Effects of Invention

The present invention makes it possible that even in a case where, in a form in which there are multiple wireless handsets under the control of one wireless relaying apparatus, one of the wireless handsets responds to an audio signal from a network, sounds to this response can be heard through the other wireless handsets and a wireless handset not participating in call can know the content of the call on a wireless handset making the call to the network.

BRIEF DESCRIPTION OF DRAWINGS

FIG. 5A shows a configuration of the signal processing unit, the mixing unit, and the packet processing unit when the mixing function of the relaying device is turned off and the callback function of the relaying device is turned on.

FIG. 5B shows a configuration of the signal processing unit, the mixing unit, and the packet processing unit when the mixing function of the relaying device is turned off and the callback function of the relaying device is turned on.

FIG. 6A shows a configuration of the signal processing unit, the mixing unit, and the packet processing unit when the mixing function and the callback function of the relaying device are turned on.

FIG. 6B shows a configuration of the signal processing unit, the mixing unit, and the packet processing unit when the mixing function and the callback function of the relaying device are turned on.

DESCRIPTION OF EMBODIMENTS

Figure 1:
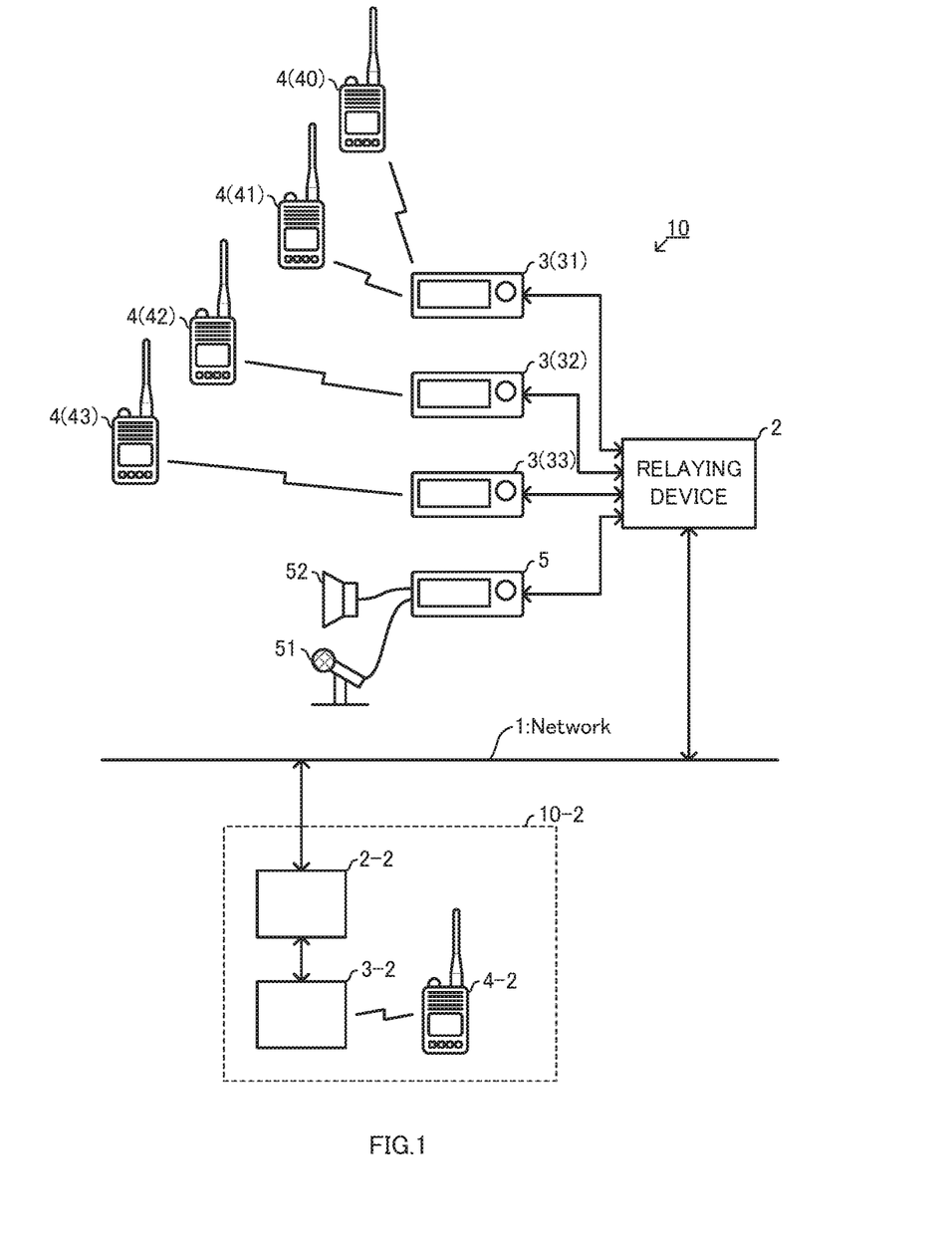
FIG. 1 shows a configuration of a communication system according to an embodiment of the present invention.
Figure 2:
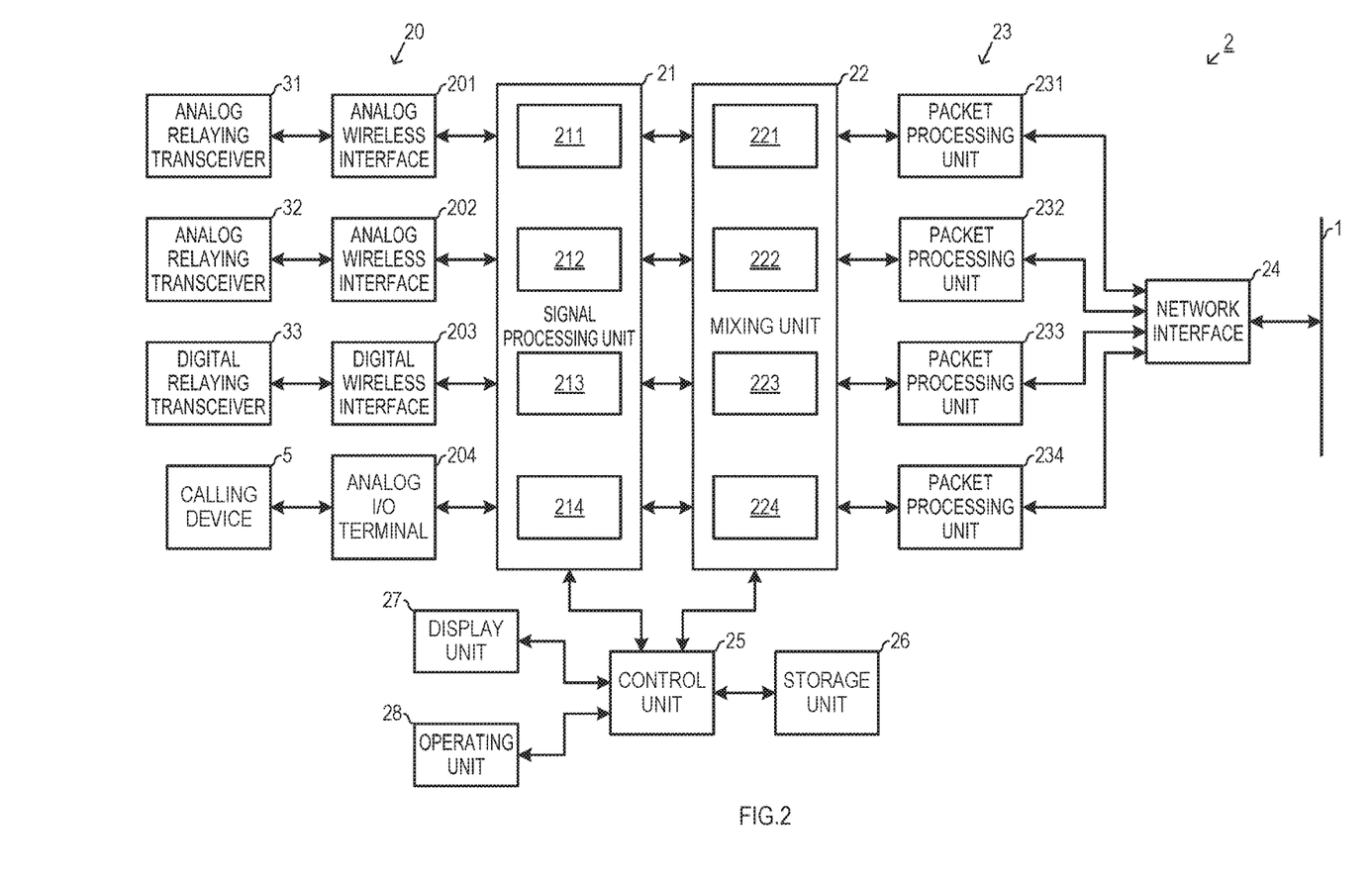
FIG. 2 is a block diagram of a relaying device in the communication system.
Figure 3A:
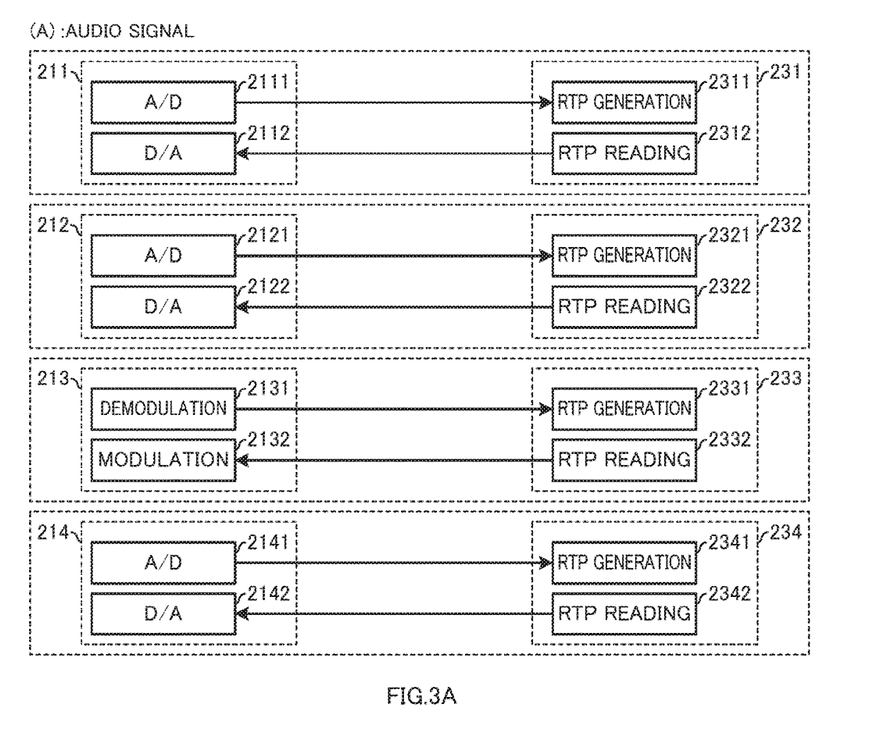
FIG. 3A shows a configuration of a signal processing unit, a mixing unit, and a packet processing unit when a mixing function and a callback function of the relaying device are turned off.
Figure 3B:
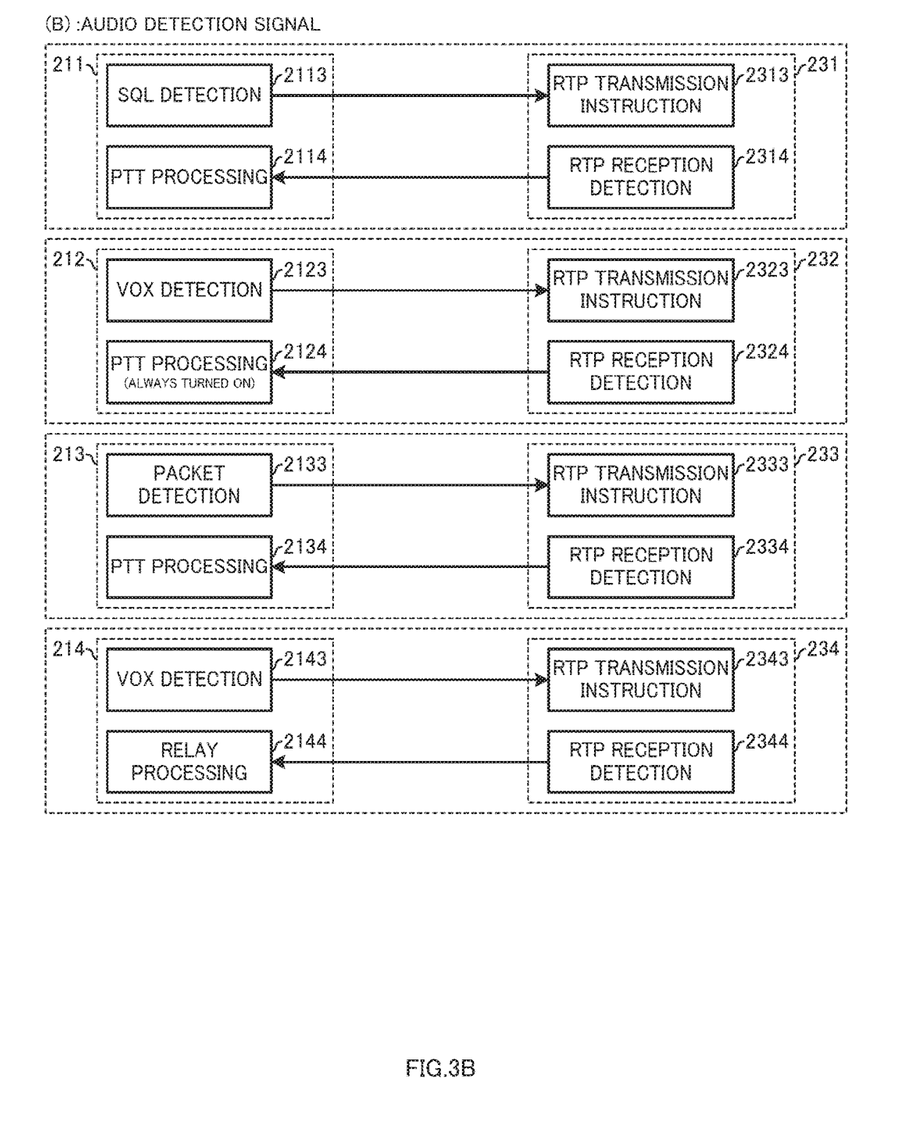
FIG. 3B shows a configuration of a signal processing unit, a mixing unit, and a packet processing unit when a mixing function and a callback function of the relaying device are turned off.

Hereinafter, a description of a relaying device and a communication system according to an embodiment of the present invention will be given, with reference to the accompanying drawings. FIG. 1 is a configuration diagram of a communication system 10 according to the embodiment of the present invention. FIG. 2 is a block diagram of a relaying device 2 according to the embodiment of the present invention. In addition, FIGS. 3A and 3B show configurations of a signal processing unit 21, a mixing unit 22, and a packet processing unit 23 of the relaying device 2.

The relaying device 2 performs a relay so that transceivers 4 (40, 41, 42, 43) used by users can communicate with another apparatus connected to the relaying device 2 over a network 1. For example, the relaying device 2 relays communication between the transceiver 40 in the figure and a transceiver 4-2 under the control of a relaying device 2-2 of another communication system 10-2. The device on which is a relay is performed as a partner of the transceivers 4 is not limited to the transceiver 4-2, but may for example be an SIP apparatus such as an IP telephone.

As shown in FIG. 2, the relaying device 2 has one network interface 24 and multiple wireless apparatus interfaces 20 (201, 202, 203, 204). The wireless apparatus interfaces 201 and 202 are analog wireless apparatus interfaces to which a half-duplex relaying transceiver (hereinafter referred to as "repeater") 31 and a full-duplex repeater 32 are connected, respectively. The half-duplex repeater 31 communicates with the transceivers 40 and 41, which are also half-duplex and used by the users. The full-duplex repeater 32 communicates with the transceiver 42, which is also full-duplex and used by the user. It should be noted that the transceivers 4 used by the users are mainly handy transceivers. Alternatively, the transceivers 4 may be transceivers other than handy transceivers (e.g. stationary transceivers).

A half-duplex transceiver is a transceiver configured to be switchable to either a transmission mode or a reception mode, as appropriate. The half-duplex transceiver includes a push-to-talk (PTT) switch or a VOX circuit, operates in the reception mode under normal conditions, and is switched to the transmission mode when the PTT switch is turned on, when the VOX circuit detects a user's voice, or when a PTT signal is externally inputted. The repeater 31 and the transceivers 40 and 41 operate in a so-called repeater mode in which a transmission frequency and a reception frequency are different. In a case where the repeater 31 is set to perform transmission on a second frequency and perform reception on a first frequency, the transceivers 40 and 41 are set to perform transmission on the first frequency and perform reception on the second frequency. Therefore, the transceiver 40 and the transceiver 41 cannot directly communicate with each other. That is, in a case where the transceiver 40 responds to a call from the repeater 31, the transceiver 41 cannot directly receive an audio signal of this response.

In addition, a full-duplex transceiver is a transceiver configured to be able to perform transmission and reception in parallel by causing a transmission circuit and a reception circuit to operate on different channels (frequencies) in parallel. Thus, half-duplex transceivers and full-duplex transceivers cannot wirelessly communicate with each other since their communication schemes are different.

The wireless apparatus interface 203 is a digital wireless apparatus interface to which a digital repeater 33 is connected. The digital repeater 33 communicates with the digital transceiver 43 used by the user. The digital transceiver 43 is a transceiver configured to digitalize an audio signal and transmits or receives it with a modulation scheme such as PSK (phase-shift-keying). Obviously, the digital transceiver 43 and an analog transceiver cannot wirelessly communicate with each other. The wireless apparatus interface 204 is an audio input/output terminal to which a calling device 5 that is not a wireless apparatus is connected (to which a wireless apparatus can also be connected). The calling device 5 includes a microphone 51 and a speaker 52 and is operated directly by an operator.

An audio signal inputted from the transceiver 4 or the calling device 5 via the wireless apparatus interface 20 is converted into an RTP packet by the signal processing unit 21, the mixing unit 22, and the packet processing unit 23 and sent to the network 1 from the network interface 24. The network interface 24 also receives an RTP packet from a communication partner on the network 1. The RTP packet received by network interface 24 is converted into an audio signal by the packet processing unit 23, the mixing unit 22, and the signal processing unit 21 and inputted to each wireless apparatus interface 20.

To the network 1 is connected one or more communication systems 10-2, in addition to the communication system 10. The respective relaying devices 2 and 2-2 of the communication systems 10 and 10-2 communicate with each other and exchange RTP (Real-time Transport Protocol) packets carrying audio call signals of the transceivers 4 and 4-2. The network 1 may employ a LAN configured by Ethernet™ or the Internet.

While four paths of the analog wireless apparatus interfaces 201 and 202, the digital wireless apparatus interface 203, and the audio input/output terminal 204 are provided as the wireless apparatus interface 20 in the embodiment, any number of wireless apparatus interfaces 20 may be provided. In addition, any number of the analog wireless apparatus interface, the digital wireless apparatus interface, and the audio input/output terminal may be combined. For example, two paths of the analog wireless apparatus interfaces, four paths of the digital wireless apparatus interfaces, or two paths of the audio input/output terminals may be provided.

The signal processing unit 21 has signal processing units 211, 212, 213, and 214 associated with the four wireless apparatus interfaces 201, 202, 203, and 204. The mixing unit 22 has mixing units 221, 222, 223, and 224 associated with the four wireless apparatus interfaces 201, 202, 203, and 204. The packet processing unit 23 also has packet processing units 231, 232, 233, and 234 associated with the four wireless apparatus interfaces 201, 202, 203, and 204.

As shown in FIGS. 3A, 4A, 5A, and 6A, the signal processing unit 21 (211, 212, 213, 214) performs processes such as analog-digital conversion and codec processing of an audio signal of audio communication, and as shown in FIGS. 3B, 4B, 5B, and 6B, generates and sends a control signal for switching between transmission and reception of a wireless apparatus.

The analog wireless apparatus interface 201, the analog signal processing unit 211, the mixing unit 221, and the packet processing unit 231 constitute a first communication path, while the analog wireless apparatus interface 202, the analog signal processing unit 212, the mixing unit 222, and the packet processing unit 232 constitute a second communication path. The digital wireless apparatus interface 203, the digital signal processing unit 213, the mixing unit 223, and the packet processing unit 233 constitute a third communication path. Furthermore, the audio input/output terminal 204, the analog signal processing unit 214, the mixing unit 224, and the packet processing unit 234 constitute a fourth communication path.

To the analog signal processing unit 211 is connected the half-duplex analog repeater 31 via the analog wireless apparatus interface 201. The analog signal processing unit 211 includes: an A/D converter 2111 that converts an analog audio signal inputted from the analog repeater 31 into a digital signal for an RTP packet; and a D/A converter 2112 that converts an audio signal to be outputted to the repeater 31 into an analog signal. The analog signal processing unit 211 also includes: an SQL detection unit 2113 that, when a squelch signal (SQL) is inputted from the analog repeater 31, generates a control signal (audio detection signal) signifying that an audio signal is present; and a PTT processing unit 2114 that outputs a PTT signal to the repeater 31 when an audio detection signal is inputted from another processing unit.

To the analog signal processing unit 212 is connected the full-duplex analog repeater 32 via the analog wireless apparatus interface 202. The analog signal processing unit 212 includes: an A/D converter 2121 that converts an analog audio signal inputted from the repeater into a digital signal for an RTP packet; and a D/A converter 2122 that converts an audio signal to be outputted to the repeater 32 into an analog signal. The analog signal processing unit 212 also includes: a VOX detection unit 2123 that detects input of an audio signal from the full-duplex repeater 32, which does not generate a squelch signal, and generates an audio detection signal upon detecting the input of the audio signal; and a PTT processing unit 2124 that always turns on a PTT signal and always allows output of an audio signal to the D/A converter 2122.

To the digital signal processing unit 213 is connected the (half-duplex) repeater 33 via the digital wireless apparatus interface 203. The digital signal processing unit 213 includes: a demodulation unit 2131 that converts a digital audio signal inputted from the repeater into a digital signal for an RTP packet; and a modulation unit 2132 that converts a digital signal for an RTP packet inputted from another processing unit into a digital audio signal in a compression format to be outputted to the repeater 33. The digital signal processing unit 213 also includes: a packet detection unit 2133 that generates an audio detection signal when a packet carrying an audio signal is inputted from the repeater 33; and a PTT processing unit 2134 that output a PTT signal to the repeater 33 when an audio detection signal is inputted from another processing unit.

To the analog signal processing unit 214 is connected the calling device 5 via the audio input/output terminal 204. The analog signal processing unit 214 includes: an A/D converter 2141 that converts an analog audio signal inputted from the calling device 5 into a digital signal for an RTP packet; and a D/A converter 2142 that converts an audio signal to be outputted to the calling device 5 into an analog signal. The analog signal processing unit 214 also includes: a VOX detection unit 2143 that detects input of an audio signal from the microphone 51 and generates an audio detection signal; and a relay processing unit 2144 that turns off the microphone and turns on the speaker 52 when an audio detection signal is inputted from another processing unit.

When an audio detection signal is inputted, the packet processing unit 23 (231, 232, 233, 234) generates an RTP packet on the basis of the audio signal then inputted, and sends it. When an RTP packet is received from the network 1, the packet processing unit 23 generates an audio detection signal and outputs an audio signal contained in that RTP packet. The packet processing units 231, 232, 233, 234 respectively send or receive an RTP packet via the network interface 24 with a communication partner on the network 1 which is either predetermined or selected and set by the user.

Since, as described above, the relaying device 2 is a device for relaying communication between the transceiver 4 and the transceiver 4-2 of the other communication system 10 connected via the network 1, exchange of audio signals among the transceivers 4 (40, 41, 42, 43) under the control of the relaying device 2 (on the downlink side) is not taken into account, with the result that when a transceiver (e.g. 40) making a call (transmitting an audio signal) to the transceiver 4-2 via the network 1, the content of the call cannot be heard through the other transceivers 4 (41, 42, 43). Therefore, by being provided with the mixing unit 22 having a mixing function and a callback function, the relaying device 2 allows an uplink audio signal of each transceiver 4 to be confirmed by the other transceivers 4.

When the mixing function and the callback function are off, each communication path independently operates not to input audio signals of the other paths and mix them with an audio signal of the own path and not to input control signals of the other paths and OR them with a control signal of the own path (see FIGS. 3A and 3B). Further, when the callback function is off, the uplink and the downlink operate independently of each other, so that an uplink signal of the own path is not mixed with a downlink audio signal and an uplink control signal of the own path is not ORed with a downlink control signal (see FIGS. 3A, 3B, 4A, and 4B).

In a state where the mixing function is off, each communication path independently operates, and an audio signal of that communication path does not flow to the other communication paths, so that secrecy of communication can be maintained. However, the transceivers 4 of the other communication paths cannot know what communication is being performed. The mixing function is turned on in a case where the content of communication needs to be shared by multiple transceivers 4 that are under the control of multiple communication paths.

Further, in a state where the callback function is off, an uplink audio signal does not flow to the downlink, so that in a case where there are multiple transceivers (e.g. 40 and 41) under the control of one path, sounds of a call on one of transceivers (e.g. 40) cannot be heard through the other transceiver (e.g. 41). The callback function is turned on in a case where the content of communication needs to be shared by multiple transceivers 4 that are under the control of one communication path.

Figure 4A:
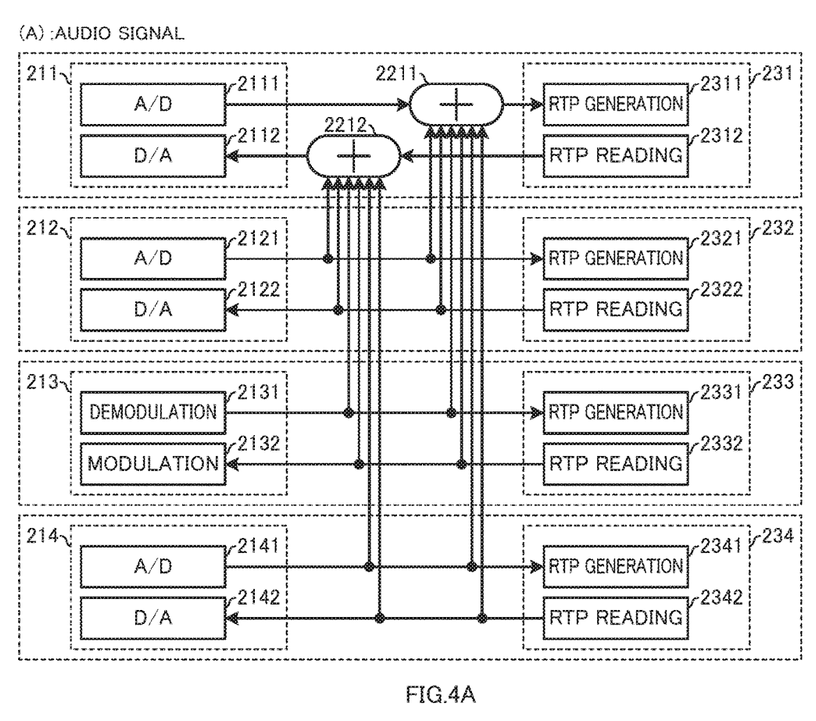
FIG. 4A shows a configuration of the signal processing unit, the mixing unit, and the packet processing unit when the mixing function of the relaying device is turned on and the callback function of the relaying device is turned off.
Figure 4B:
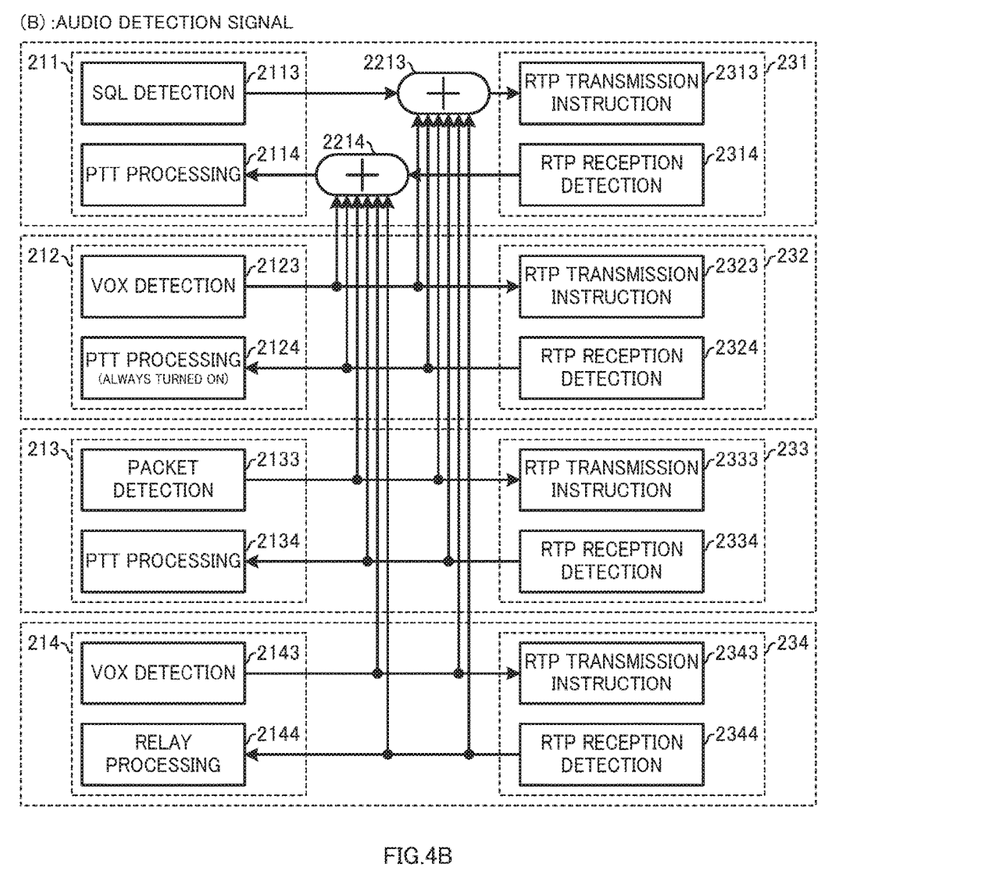
FIG. 4B shows a configuration of the signal processing unit, the mixing unit, and the packet processing unit when the mixing function of the relaying device is turned on and the callback function of the relaying device is turned off.
Figure 5A:
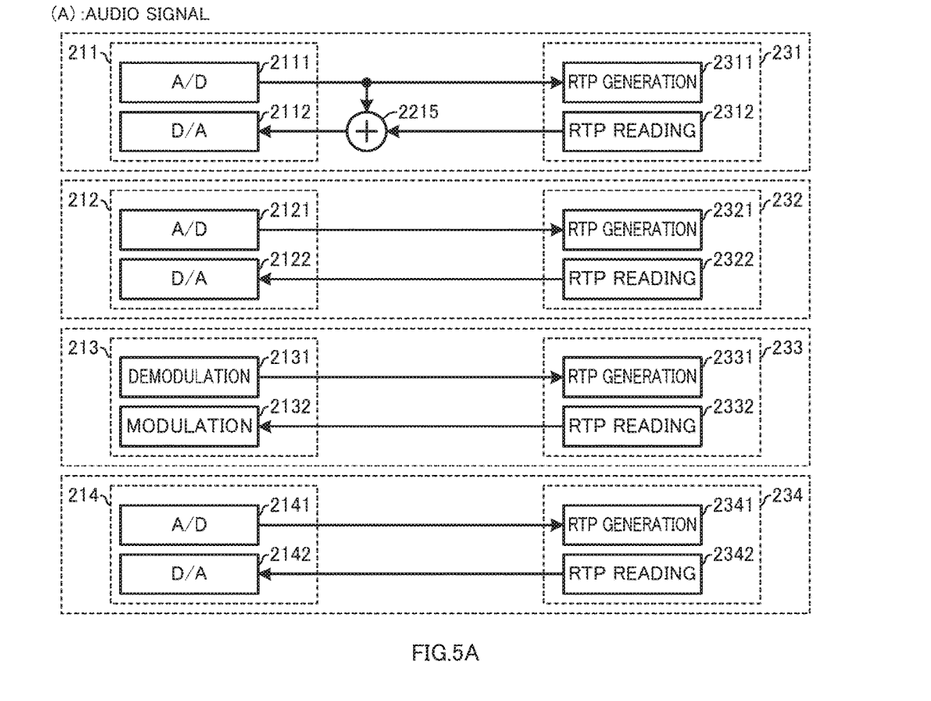
Figure 5B:
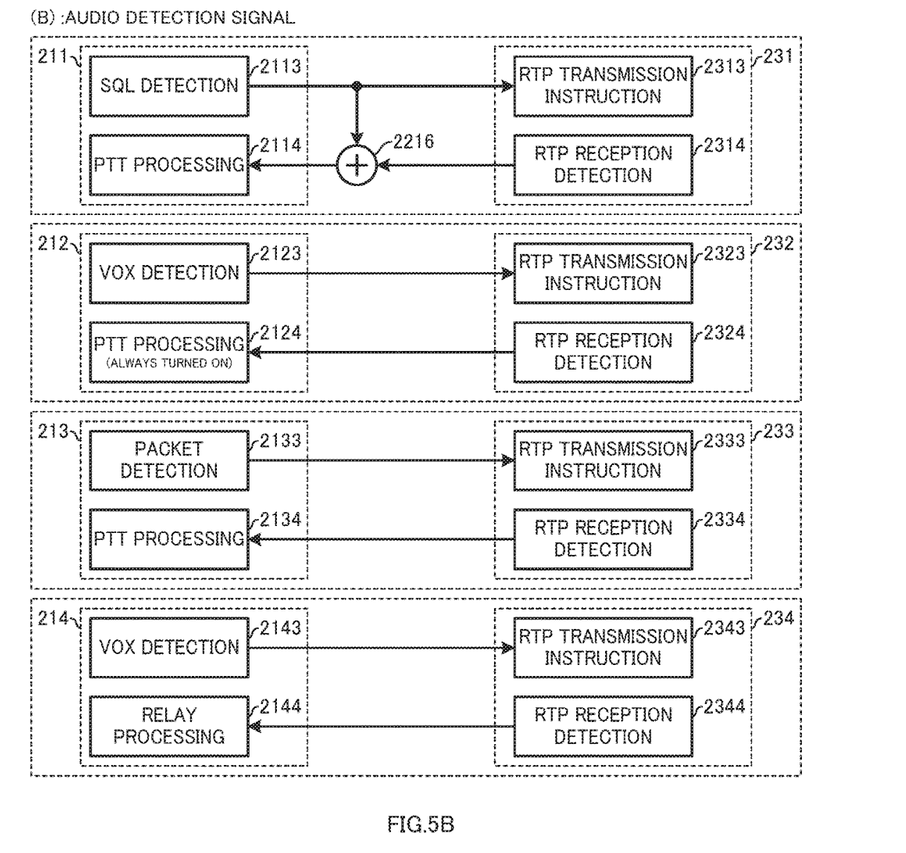
Figure 6A:
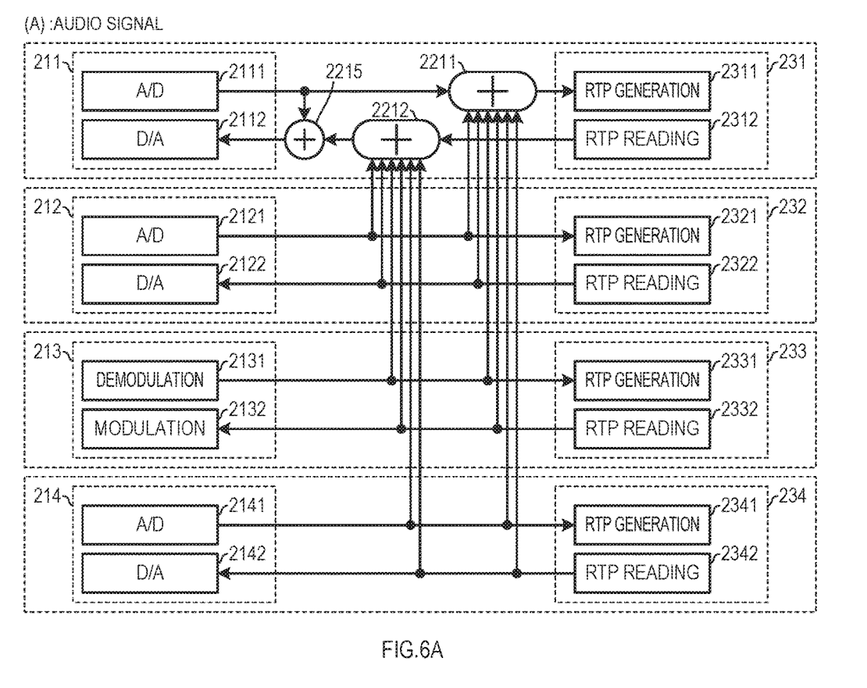
Figure 6B:
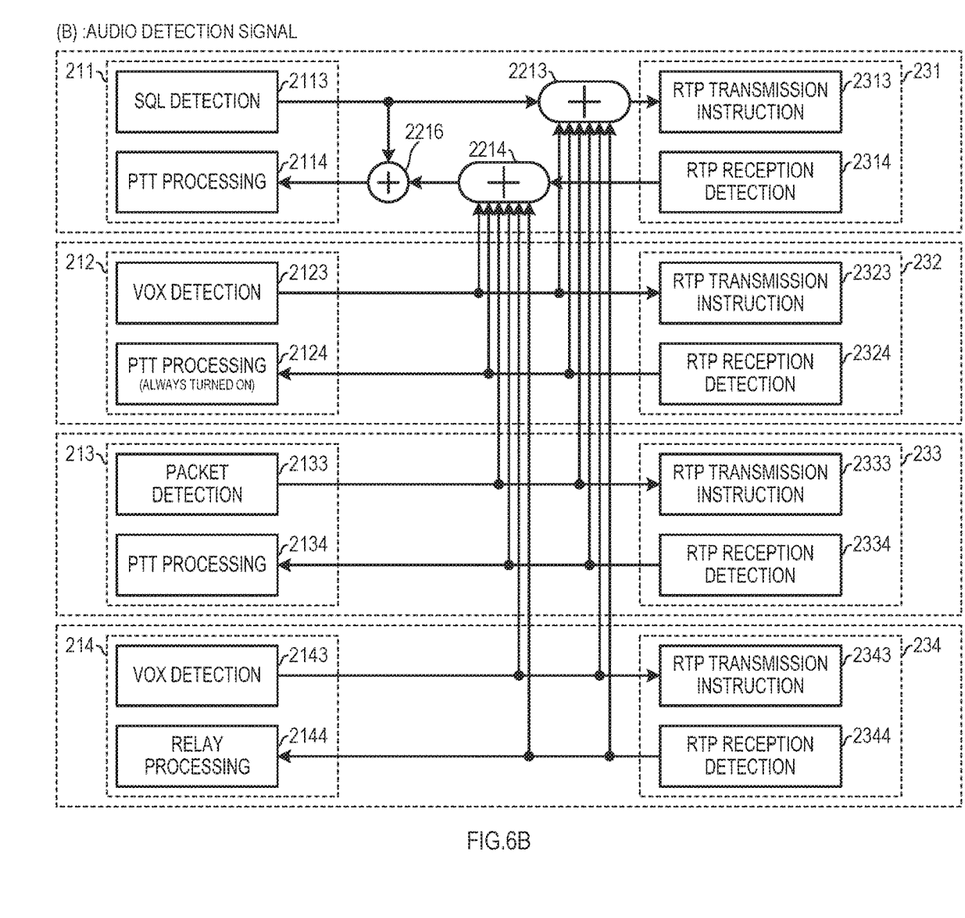

FIGS. 3A to 6B show configurations of the signal processing unit 21, the mixing unit 22, and the packet processing unit 23 of the relaying device 2. FIGS. 3A and 3B show a connection form when the mixing function and the callback function are off, and FIGS. 4A and 4B show one example of the connection form when only the mixing function is on. FIGS. 5A and 5B show a connection form when only the callback function is on, and FIGS. 6A and 6B show one example of the connection form when both the mixing function and the callback function are on.

When the mixing function is turned on, an audio signal and a control signal (audio detection signal) of each communication path are additively synthesized mutually, and outputted from each communication path, as shown in FIGS. 4A, 4B, 6A, and 6B. Note that although FIGS. 4A, 4B, 6A, and 6B only show the connection form of the mixing unit 221 of the first communication path, each of the mixing units 222, 223, 224 may have a connection form which is similar to that of the mixing unit 221 and, in each of the second to fourth communication paths, too, an audio signal and a control signal (audio detection signal) of the other path may be mixed and outputted.

The mixing unit 221 has adders 2211 and 2212 that additively synthesize audio signals and adders 2213 and 2214 that OR audio detection signals.

The adder 2211 additively synthesizes audio signals inputted from the A/D converter 2111, the A/D converter 2121, the demodulation unit 2131, the A/D converter 2141, and RTP packet reading units 2322, 2332, and 2342. The adder 2211 inputs the audio signal to an RTP packet generation unit 2311 of the packet processing unit 231 as an uplink audio signal. Specifically, the adder 2211 additively synthesizes all audio signals to be outputted from any unit other than the packet processing unit 231 (RTP packet reading unit 2312), which is a destination of audio signals to be inputted, to generate an uplink audio signal.

The adder 2212 additively synthesizes audio signals inputted from the A/D converter 2121, the demodulation unit 2131, the A/D converter 2141, and the RTP packet reading units 2312, 2322, 2332, and 2342. The adder 2212 inputs the audio signal to the D/A converter 2112 of the signal processing unit 211 as a downlink audio signal. Specifically, the adder 2212 additively synthesizes all audio signals to be outputted from any unit other than the signal processing unit 211 (A/D converter 2111), which is a destination of audio signals to be inputted, to generate an uplink audio signal.

The adder 2213 for ORing audio detection signals ORs audio detection signals inputted from the SQL detection unit 2113, the VOX detection unit 2123, the packet detection unit 2133, the VOX detection unit 2143, and RTP packet reception detection units 2324, 2334, and 2344. Then, the adder 2213 inputs the ORed audio detection signal to an RTP packet transmission instruction unit 2313 of the packet processing unit 231. With this, the above-described uplink audio signal generated by the adder 2211 is outputted from the RTP packet generation unit 2311 to the network interface 24.

The adder 2214 ORs audio detection signals to be inputted from the VOX detection unit 2123, the packet detection unit 2133, the VOX detection unit 2143, and the RTP packet reception detection units 2314, 2324, 2334, 2344. Then, the adder 2214 inputs the ORed audio detection signal to the PTT processing unit 2114 of the signal processing unit 211. With this, the above-described downlink audio signal generated by the adder 2212 is inputted from the D/A converter 2112 via the wireless apparatus interface 201 to the repeater 31, and transmitted to the user transceiver 41.

With the processing of the mixing unit 22 as described above, uplink and downlink audio signals of all paths to be mixed are additively synthesized and transmitted to the transceiver 4 of each path. Thus, mutual communications of multiple units beyond differences in models is enabled.

While both the uplink adders 2211 and 2213 and the downlink adders 2212 and 2214 are provided in FIGS. 4A, 4B, 6A, and 6B, only either the uplink adders 2211 and 2213 or the downlink adders 2212 and 2214 may be provided. Further, while the uplink adders 2211 and 2213 are used to mix both uplink and downlink signals of the other communication paths, they may be used to mix only signals of either type (e.g. the uplink signals). Similarly, while the downlink adders 2212 and 2214 are used to mix both uplink and downlink signals of the other communication paths, they may be used to mix only signals of either type (e.g. the uplink signals).

Alternatively, in the relaying device 2, all communication paths may become a target of mixing when the mixing function is turned on or the user may be allowed to select which communication path is to be mixed.

Here, in FIG. 2, the control unit 25 is connected to the signal processing unit 21 and the mixing unit 22. To the control unit 25 are connected a storage unit 26, a display unit 27, and an operating unit 28. In the storage unit 26 is stored information on selection of a signal processing path (mixing group) of multiple signal processing paths that mutually performs mixing when the mixing function is turned on. Based on an indication on the display unit 27, the user can operate the operating unit 28 to set a mixing group.

Alternatively, a tone signal such as a DTMF signal or a 5-tone signal may be inputted from the transceiver 4 (40, 41, 42, 43), and the tone signal may thereby enable turning on or off of the mixing function, selection of a mixing group, or setting of a mixing group.

When the callback function of the first communication path is turned on, an adder 2215 additively synthesizes an uplink audio signal into a downlink audio signal and supplies it to the signal processing unit 211, as shown in FIGS. 5A, 5B, 6A, and 6B. Further, an adder 2216 ORs an uplink control signal (audio detection signal) with a downlink signal and supplies it to the signal processing unit 211.

The following gives a detailed description. The adder 2215 mixes an uplink audio signal of the same path (first path) inputted from the A/D converter 211 with a downlink audio signal. The resulting audio signal is inputted to the D/A converter 2112 of the signal processing unit 211. The adder 2216 ORs an audio detection signal inputted from the SQL detection unit 2113 with an audio detection signal generated by the RTP packet reception detection unit 2314. Then, the adder 2216 inputs the ORed audio detection signal to the PTT processing unit 2114 of the signal processing unit 211. This causes the downlink audio signal generated by the aforementioned adder 2215 to be inputted to the repeater 31 and transmitted to the transceivers 40 and 41.

With this, in a case where the transceiver 40 responds to a call from the network 1 (e.g. the transceiver 4-21) on the first frequency, the callback function of the relaying device 2 causes this audio signal to be transmitted by the repeater 31 on the second frequency, so that the transceiver 41, too, can receive and reproduce this audio signal.

Note that although FIGS. 5A, 5B, 6A, and 6B only show the callback function of the first communication path, i.e. the connection form of the mixing unit 221, each of the mixing units 222, 223, 224 may have a similar connection form, so that an uplink audio signal and an uplink control signal (audio detection signal) may be mixed with a downlink audio signal and a downlink control signal (audio detection signal). Note that since the transceivers 40 and 41 are communication apparatuses of a half-duplex communication scheme, each of the apparatuses does not receive the second frequency while it is transmitting an audio signal (on the first frequency), so that there is no risk of echo or acoustic feedback.

Further, as for the callback function, based on an indication on the display unit 27, the user can operate the operating unit 28 to set the callback function. Further, a tone signal such as a DTMF signal or a 5-tone signal may be inputted from the transceiver 4 (40, 41), and the tone signal may thereby enable turning on or off of the callback function.

While the embodiment describes an example in which the callback function is applied to the half-duplex transceivers 40 and 41, the callback function of the present invention is also applicable to transceivers of a full-duplex scheme.

REFERENCE NUMERALS

1 Network
2 Relaying device
3 (31, 32, 33) Relaying transceiver (repeater)
4 (40, 41, 42, 43) (User) transceiver (wireless handset)
10 Communication system
20 Wireless apparatus interface
21 Signal processing unit
22 Mixing unit
23 Packet processing unit
24 Network interface
2215, 2216 Adder

What is claimed is:

1. A relaying device comprising:
   a wireless apparatus interface connected to a wireless relaying apparatus communicating with multiple wireless handsets, inputting a received signal from the wireless relaying apparatus, and outputting a sending signal to be sent to the multiple wireless handsets to the wireless relaying apparatus, the multiple wireless handsets transmitting an audio signal at a first frequency and receiving the audio signal at a second frequency, the wireless relaying apparatus transmitting the audio signal at the second frequency and receiving the audio signal at the first frequency;
   a signal processing unit connected to the wireless apparatus interface;
   a network interface connected to a network acting as a data communication network and sending or receiving packets to or from another network device connected to the network;
   a packet processing unit connected to the network interface; and
   a mixing unit provided between the signal processing unit and the packet processing unit, wherein
   the signal processing unit outputs a received signal inputted from the wireless apparatus interface as an uplink audio signal,
   the packet processing unit packetizes the uplink audio signal and outputs the uplink audio signal to the network interface,
   the packet processing unit reads out an audio signal from packets inputted from the network interface and outputs the audio signal as a downlink audio signal,
   when a callback function is on:
      the mixing unit mixes the downlink audio signal and the uplink audio signal and inputs the mixed downlink audio signal and the mixed uplink audio signal to the signal processing unit, and
      the signal processing unit outputs the mixed downlink audio signal and the mixed uplink audio signal inputted from the mixing unit to the wireless apparatus interface as a sending signal,
   when the callback function is off,
      the mixing unit inputs the downlink audio signal to the signal processing unit, and
      the signal processing unit outputs the downlink audio signal inputted from the mixing unit to the wireless apparatus interface as the sending signal, and
   the wireless relaying apparatus sends the sending signal to the multiple wireless handsets at the second frequency.

2. The relaying device according to claim 1, further comprising multiple communication paths including the wireless apparatus interface, the signal processing unit, and the packet processing unit,
   wherein the mixing unit inputs an uplink audio signal or a downlink audio signal of another communication path to the packet processing unit together with the uplink audio signal and, furthermore, inputs an uplink audio signal or a downlink audio signal of said another communication path to the signal processing unit together with the downlink audio signal.

3. The relaying device according to claim 2, wherein multiple wireless apparatus interfaces of the multiple paths include both an analog wireless apparatus interface and a digital wireless apparatus interface.

4. The relaying device according to claim 2, wherein a half-duplex wireless relaying apparatuses or full-duplex wireless relaying apparatuses are connected to the multiple wireless apparatus interfaces of the multiple paths, respectively.

5. The relaying device according to claim 1, further comprising:
a control unit that sets on and off of the callback function.

6. A communication system comprising:
a relaying device including:
a wireless apparatus interface;
a signal processing unit connected to the wireless apparatus interface;
a network interface connected to a network acting as a data communication network and sending or receiving packets to or from another network device connected to the network;
a packet processing unit connected to the network interface; and
a mixing unit provided between the signal processing unit and the packet processing unit;
a wireless relaying apparatus connected to the wireless apparatus interface; and
multiple wireless handsets, wherein
the wireless relaying apparatus communicates with the multiple wireless headsets,
the wireless apparatus interface of the relaying device is inputted with a received signal from the wireless relaying apparatus, and outputs a transmitting signal to be transmitted to the multiple wireless headsets to the wireless relaying apparatus,
the multiple wireless handsets transmit an audio signal at a first frequency and receive the audio signal at a second frequency,
the wireless relaying apparatus transmits the audio signal at the second frequency and receives the audio signal at the first frequency,
the signal processing unit outputs a received signal inputted from the wireless apparatus interface as an uplink audio signal,
the packet processing unit packetizes the uplink audio signal and outputs the uplink audio signal to the network interface,
the packet processing unit reads out an audio signal from packets inputted from the network interface and outputs the audio signal as a downlink audio signal,
when a callback function is on:
the mixing unit mixes the downlink audio signal and the uplink audio signal and inputs the mixed downlink audio signal and the mixed uplink audio signal to the signal processing unit, and
the signal processing unit outputs the mixed downlink audio signal and the mixed uplink audio signal inputted from the mixing unit to the wireless apparatus interface as a transmitting signal,
when the callback function is off:
the mixing unit inputs the downlink audio signal to the signal processing unit, and
the signal processing unit outputs the downlink audio signal inputted from the mixing unit to the wireless apparatus interface as the sending signal, and
the wireless relaying apparatus transmits the sending signal at the second frequency when the sending signal is inputted from the wireless apparatus interface.

7. The communication system according to claim 6, further comprising:
a control unit that sets on and off of the callback function.

8. A method for relaying an audio signal between a wireless apparatus interface and a network interface, the wireless apparatus interface connected to a wireless relaying apparatus communicating with multiple wireless handsets and outputting a transmitting signal to be transmitted to the wireless headsets to the wireless relaying apparatus, a network interface connected to a network acting as a data communication network and sending or receiving packets to or from another network device connected to the network, the multiple wireless handsets transmitting an audio signal at a first frequency and receiving the audio signal at a second frequency, the wireless relaying apparatus transmitting the audio signal at the second frequency and receiving the audio signal at the first frequency, the method comprising:
packetizing a received signal inputted from the wireless apparatus interface, outputting the packetized signal from the network interface, and inputting the received signal again to the wireless apparatus interface as an uplink audio signal;
inputting an audio signal read out from audio packets inputted from the network interface to the wireless apparatus interface as a downlink audio signal;
when a callback function is on:
mixing the downlink audio signal and the uplink audio signal and inputting the mixed downlink audio signal and the mixed uplink audio signal to the signal processing unit; and
causing the signal processing unit to output the mixed uplink audio signal and the mixed downlink audio signal as a sending signal to the wireless apparatus interface; and
when the callback function is off:
inputting the downlink audio signal to the signal processing unit, and
causing the signal processing unit to output the downlink audio signal inputted from the mixing unit to the wireless apparatus interface as the sending signal, and
causing the wireless relaying apparatus to send the send signal to the multiple wireless handsets at the second frequency.

9. The method according to claim 8, further comprising:
setting on and off of the callback function by a control unit.

* * * * *